Figure 1:
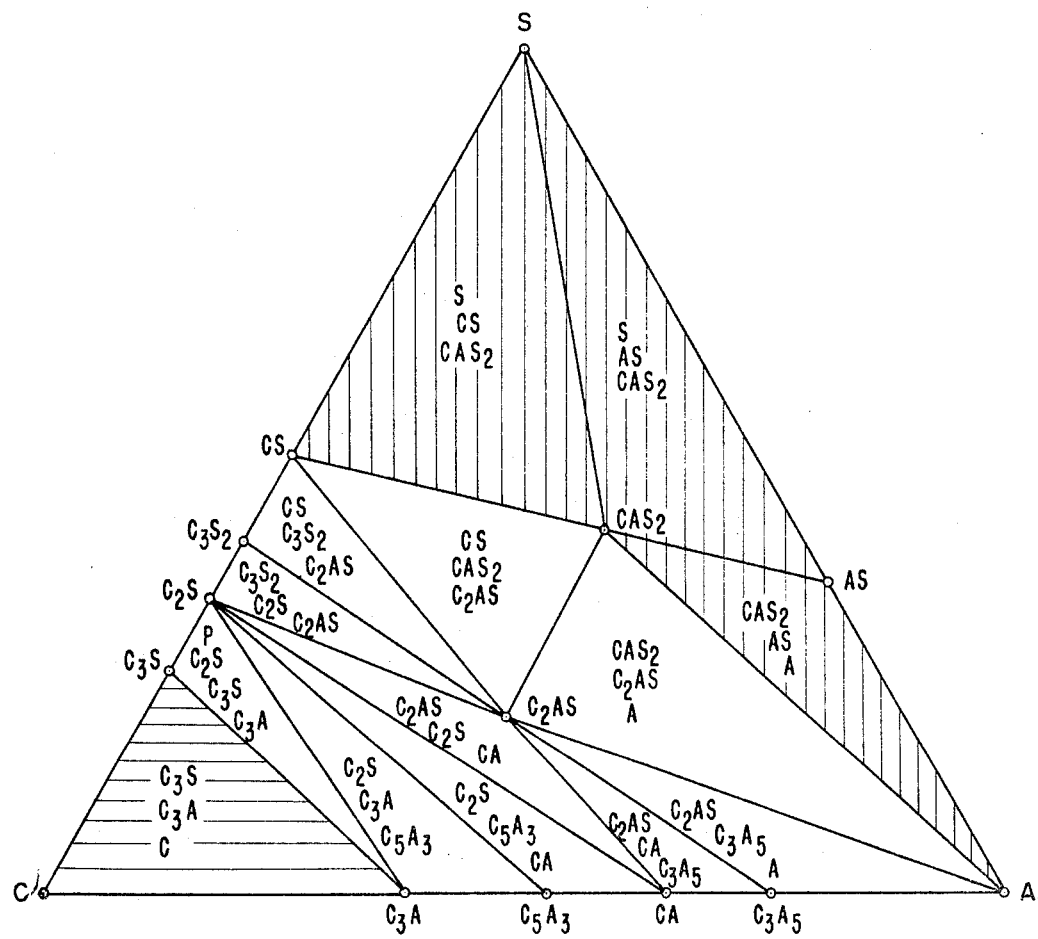

Sept. 13, 1966 R. M. BUSCHE ET AL 3,272,771
METHOD FOR THE CROSSLINKING OF POLYMERIC MATERIALS
Filed July 10, 1963

INVENTORS
DENNIS LIGHT FUNCK
ROBERT MARION BUSCHE

BY

ATTORNEY

United States Patent Office 3,272,771
Patented Sept. 13, 1966

3,272,771
METHOD FOR THE CROSSLINKING OF POLYMERIC MATERIALS
Robert Marion Busche and Dennis Light Funck, Wilmington, Del., assignors to E. I. du Pont de Nemours and Company, Wilmington, Del., a corporation of Delaware
Filed July 10, 1963, Ser. No. 295,287
24 Claims. (Cl. 260—41)

This application is a continuation-in-part of copending Serial No. 219,005, filed August 23, 1962 and now abandoned.

The present invention relates to a novel way of crosslinking polymeric materials, to novel compositions capable of crosslinking, and the novel products obtained therefrom.

The crosslinking of polymeric materials is a well-known art. Thus, elastomers such as natural rubber, are crosslinked or vulcanized by the use of sulfur, which on heating reacts with the carbon of the unsaturated bonds in the polymer molecule to form a bridge between two molecules so that one polymer molecule becomes bonded to a second polymer molecule. If a sufficient number of random crosslinks are formed, the crosslinked polymer becomes a single molecule or assumes the shape of a molecular network. The characteristic property of a crosslinked polymer is its intractibility above the softening or melting point normally observed in the uncrosslinked or base polymer. Thus, whereas the uncrosslinked polymer has a marked softening point or melting point above which the polymer is fluid and deformable, the crosslinked polymer retains its shape and will tend to return to that shape when deformed at all temperatures at which the polymer is stable and can not be permanently deformed. Once crosslinked, the polymer is no longer fabricable, except possibly by machining. Crosslinked polymers have found wide utility because of the significant improvement in the physical properties obtained by crosslinking. Thus, by vulcanizing ethylenically unsaturated hydrocarbon elastomer bases elasticity, impact resistance, flexibility, thermal stability and many other properties are either introduced or improved.

A second group of crosslinked polymers comprises those materials which are known as "thermosetting resins." Thermosetting resins are derived from monomer units which have more than one polymerization site, so that they are capable of adding more than one molecule to the growing polymer chain. These materials are polymerized to an intermediate molecular weight, fabricated into the desired shape and then further polymerized until a crosslinked structure is obtained.

The disadvantage of both elastomeric and thermosetting resins is that, in general, they require special manufacturing techniques in order to fabricate the base material, which has very poor resin properties, into the final product, which has the desired product properties, the crosslinking of the resin taking place during fabrication. Additionally, once fabricated, the material is of no further use if it does not meet the specifications for the particular article.

In the field of saturated addition polymers, which contain no additional polymerization sites, generally classified as thermoplastic polymers, crosslinking is achieved by different methods. Thus, saturated hydrocarbon polymers are crosslinked by reactions resulting from the addition of a peroxide to the polymer at elevated temperatures. Peroxides decompose to form free radicals which in turn attack the polymer chain to form crosslinking sites which then react to form crosslinks. Instead of peroxides, other free radical forming compounds may be used. The crosslinking reaction is generally initiated by heating the polymer to elevated temperatures at which the peroxide decomposes. Unfortunately, most peroxides decompose in the temperature range in which it is desirable to fabricate a thermoplastic resin. Consequently, it is difficult to separate the fabrication step from the crosslinking step, which destroys the utility of the polymer if the product is not acceptable. Premature crosslinking may also cause significant problems during fabrication through plugging of fabrication equipment. Reuse of resins into which an unreacted crosslinking agent has been incorporated is also difficult since in preparing the polymer for reuse the material is heated to temperatures at which the crosslinking agent reacts with the resin.

The most recently developed method for crosslinking thermoplastic polymers comprises subjecting a fabricated article to irradiation. This method of crosslinking resins has the great advantage of separating the fabricating step from the crosslinking step. The limitations of this method are, however, that the crosslinking is slow and difficult to accomplish when it is desired to crosslink thick or massive shapes. Additionally, this method of crosslinking is substantially more expensive and requires high initial equipment investment as compared to the older crosslinking techniques.

It is, therefore, one of the objects of the present invention to provide a crosslinking process for thermoplastic resins which avoids the disadvantages of the prior art processes.

It is another object of the present invention to provide a crosslinking process which is entirely separate from the fabrication process.

It is a further object to provide a crosslinking process which allows the reuse of fabricated resins prior to crosslinking.

It is still another object to provide a novel cross-linking process which is rapid and economic.

Still another object is to provide crosslinked thermoplastic resins having improved properties over similar compositions made by prior art crosslinking techniques.

Another object is to provide thermoplastic resin compositions which can be fabricated by standard, fabricating techniques and are thereafter readily crosslinked.

Other objects will become apparent hereinafter.

The present invention comprises admixing an addition polymer of an ethylenically unsaturated monomer and an ethylenically unsaturated carboxylic acid group containing comonomer, said acid group containing monomer being present in a concentration of at least 0.2 percent, and preferably from 0.2 percent to 25 mol percent, based on the polymer, with a hydrolyzable cocrystallized oxide of a base forming metal and an amphoteric element having the general formula $Me_kO_lEl_mO_n$, where Me is preferably a metal selected from the group consisting of metals in Groups I and II of the Periodic Table and El is preferably an element selected from the class consisting of silicon, aluminum, titanium, vanadium, molybdenum, tungsten, chromium, manganese, arsenic, bismuth, antimony, tin and lead, and $k$, $l$, $m$, and $n$ are integers depending on the valency of Me and El and the cocrystallized ratio of the two oxides said cocrystallized hydrolyzable oxide being employed in a concentration of 2 to 90 percent, based on the composition, fabricating the polymer into the desired shape and thereafter treating said fabricated article with water until at least 10 percent of the carboxylic acid groups have been neutralized by the treatment with water. The present invention also encompasses the compositions obtained by the admixing of the carboxylic acid group containing copolymer with the hydrolyzable cocrystallized oxide and the crosslinked compositions obtained by the treatment of the copolymer/oxide mixture with water. The acid containing copolymers employed in the present invention have been defined for the purposes of the present invention as "base copolymers," the copolymers containing the hydrolyzable cocrystallized oxide as "filled copolymers," the hydrolyzable cocrystallized oxides as "oxides" or "aquasetting reagents," the water treated filled copolymers as "aquaset copolymers" and the process of converting the filled copolymer into the aquaset copolymer as "neutralization."

The present invention is based on the discovery of a controllable crosslinking reaction through release of a base by the aquasetting reagents with the base copolymer. It was initially discovered that a substantially water-insoluble base, such as alkaline earth metal hydroxide crosslinks a base copolymer when incorporated into the copolymer. Through the use of the aquasetting reagents of the present invention, it was discovered that the crosslinking reaction of the base could be suppressed until such time as desired, at which time the base is released from the oxide through treatment with water and causes the filled copolymer to aquaset. It was further discovered that the crosslinking in the aquasetting process occurs through the added and hydrated oxide which is known to form an inorganic polymeric type of gel. In this respect, aquaset copolymers differ from crosslinked copolymers obtained heretofore and also from filled crosslinked copolymers which are filled with the normal type of fillers, such as silica and carbon. As the result of chemically binding this specific type of filler to the copolymer base, the aquaset copolymers have physical properties far superior to those obtained on crosslinking filled polymers using established crosslinking methods and reagents.

The formation of the base copolymers suitable as starting material in preparation of aquaset copolymers by the process of the present invention is established in the art and not considered a part of the present invention. In general, the base copolymer should meet the following requirements: (1) it must be the addition polymer of a carbon double bond, i.e., the polymer should not contain functional groups in the polymer chain backbone such as is the case in condsensation polymers; (2) it must contain free carboxylic acid groups; and (3) it must be of sufficiently high enough molecular weight to be fabricable in the uncrosslinked form. Although it is preferable to use copolymers of monomers containing no carboxylic acid groups with carboxylic acid group containing monomers, the present invention is also applicable to homopolymers of carboxylic acid group containing monomers or copolymers of two or more acid group containing monomers. The polymerizable monomers that may be employed to form the base copolymers have the general formula

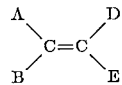

where A and B are hydrogen or halogen, D is hydrogen, halogen or methyl, E is hydrogen, halogen, alkyl, cycloalkyl, aryl, alkenyl, haloaryl, haloalkyl, cyano, carboalkoxy, acyloxy, aldehyde, ketone, amido, imido, ether and the like. The more important monomer classes are the hydrocarbon monomers, $CH_2=CHR$, where R is a hydrogen, an alkyl or alkenyl group of one to eight carbon atoms, or an aryl group of six to ten carbons; the vinyl halide monomers, $CH_2=CHX$, where X is a halogen, and particularly chlorine; the vinylidene halide monomers, $CH_2=CX_2$, X being a halogen; acrylic and alkacrylic monomers, such as the esters, amides and nitriles of acrylic and methacrylic acid, specific examples of such are ethyl acrylate, methyl methacrylate, methoxy methyl methacrylate, butyl methacrylate, chloroethyl methacrylate, β-diethyl aminomethacrylate, methacrylonitrile, acrylamide, methacrylamide; the vinyl carboxylates, such as vinyl formate vinyl chloroacetate, vinyl butyrate, vinyl laurate; the unsaturated aldehydes and ketones, such as acrolein, methacrolein and methyl vinyl ketone; and the unsaturated ethers such as vinyl ether ether and vinyl isobutyl ether.

Particularly preferred are the base copolymers of hydrocarbon monomers, $CH_2=CHR$, defined above, in which the concentration of the hydrocarbon monomer is at least 50 mol percent. The aquaset compositions of these base copolymers show the greatest improvement in physical properties, which improvements, furthermore, are of high utilitarian significance.

The second essential component of the base copolymer comprises an α,β-ethylenically unsaturated carboxylic acid group containing monomer having preferably from 3 to 8 carbon atoms. Examples of such monomers are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because of its chemical reactivity being that of an acid. Similarly, other α,β-monoethylenically unsaturated anhydrides of carboxylic acids can be employed. As indicated, the concentration of acidic monomer in the copolymer is at least 0.2 mol percent, and, preferably, from 0.2 to 25 mol percent.

The base copolymers employed in forming the aquaset copolymers of the present invention may be prepared in several ways. Thus, the copolymers may be obtained by the copolymerization of a mixture of the ethylenic monomer and the carboxylic acid monomer. This method is preferred for the copolymers of ethylene, styrene, halogenated ethylenes, and functionally substituted ethylenes employed in the present invention. Methods employed for the preparation of such carboxylic acid copolymers have been described in the literature. In a preferred process, a mixture of the two monomers is introduced into a polymerization environment maintained at elevated pressures, 10 to 3000 atmospheres, and elevated temperatures, 100 to 300° C., together with a free radical polymerization initiator such as a peroxide. An inert solvent for the system, such as water or benzene, may be employed, or the polymerization may be substantially a bulk polymerization.

The present invention, however, is not limited to copolymers obtained by direct copolymerization of an ethylenic monomer with an α,β-ethylenically unsaturated carboxylic acid comonomer. The base copolymers employed in the preparation of aquaset copolymers may also be obtained by the grafting of the acid comonomer to any suitable resin base. Such graft copolymers may be obtained by exposing a solution or finely divided powder of the resin to ionizing radiation in the presence of the carboxylic acid comonomer. In another method, the resin, in solution or in finely divided form, is contacted with a solution of the acid and a peroxide. Graft copolymerization has been described in great detail in the literature and is for that reason not further detailed. These techniques are preferably employed with polyolefins obtained from olefins of higher molecular weight than ethylene, such as propylene, butene-1, etc., since these latter monomers do not readily lend themselves to the direct copolymerization with the acid comonomer, although polymers of directly copolymerizable monomers can, of course, also be prepared in this manner. Base copolymers may also be prepared by copolymerization of the ethylenic monomer with an α,β-ethylenically unsaturated carboxylic acid derivative which subsequently or during copolymerization is reacted either completely or in part to form the free acid. Thus, hydrolysis, saponification or pyrolysis may be employed to form an acid copolymer from an ester copolymer. Acid formation may be simultaneous with neutralization.

The copolymer base need not necessarily comprise a two component polymer. This is particularly the case with the preferred hydrocarbon base copolymers. Thus, although the olefin content of the copolymer should be at least 50 mol percent, more than one olefin can be employed to provide the hydrocarbon nature of the copolymer base. Additionally, any third copolymerizable monomer can be employed in combination with the olefin and the carboxylic acid comonomer. The scope of the hydrocarbon base copolymers suitable for use in the present invention is illustrated by the following examples: Ethylene/acrylic acid copolymers, ethylene/methacrylic acid copolymers, ethylene/itaconic acid copolymers, ethylene/methyl hydrogen maleate copolymers, ethylene/maleic acid copolymers, styrene/acrylic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, butadiene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, polyethylene/acrylic acid graft copolymers, polyethylene/methacrylic acid graft copolymers, polymerized ethylene/propylene acrylic acid graft copolymers, polymerized ethylene/butene-1 methacrylic acid graft copolymers, polymerized ethylene/vinyl acetate methacrylic acid graft copolymers, polymerized ethylene/vinyl acetate methacrylic acid graft copolymers, polypropylene/acrylic acid graft copolymers, polypropylene/methacrylic acid graft copolymers, polybutene/acrylic acid graft copolymers, poly-3-methylbutene/acrylic acid graft copolymers and polyethylene/acrylic acid/ethyl acrylate graft copolymers.

The copolymers may also, after polymerization but prior to neutralization, be further modified by various reactions to result in polymer modifications which do not interfere with the neutralization. Halogenation of an olefin acid copolymer is a example of such polymer modification.

As indicated hereinabove, the aquaset copolymers of present invention are formed by the adding of the oxide to the base copolymer and on fabrication neutralizing the filled composition. The oxides employed in the present invention have three characteristics which make them suitable for use in the present invention: (1) they contain an oxide of a basic metal which on hydration results in a base, and (2) they are hydrolyzable and on being contacted with water will rearrange to result in free base, and (3) they contain the basic oxides in cocrystallized form such that the oxides are not free to react. In general, all cocrystallized oxides of basic metals and of amphoteric elements can be employed. The oxide may contain more than one base metal or more than one amphoteric element. Preferred basic metal oxides are those of alkali and the alkaline earth metals, such as the oxides of calcium, magnesium, barium, strontinum, sodium and potassium. The oxides of amphoteric elements which cocrystallize with the basic metal oxides are the oxides of the amphoteric elements listed hereinabove, and are preferably silica, alumina, titania, molybdena, and chromium oxides. Particularly readily available hydrolyzable compositions are the cements and, in particular, Portland cements. The various combinations of calcium oxide, shown as C in the figure, silica, shown as S in the figure, and alumina, shown as A in the figure, are illustrated in the triangular concentration diagram attached hereto as FIGURE 1. In this diagram, the pure components are represented by the apieces of the triangle, the binary mixtures by points on the three sides and ternary mixtures by points within the triangle. Each side of the triangle is divided into one hundred parts and all compositions are given as percentage weights of the components. The lines within the large triangle divide the latter in fourteen small triangles which enclose all possible mixtures of the three components C, S and A. Cocrystallized oxides are indicated by the combination of C, S and A. The Portland cements are shown in the triangle containing the letter P. Compositions in the horizontally lined triangle comprising $C_3S$, $C_3A$ and C are generally considered unsuitable for the formation of aquaset copolymers, since they contain free calcium oxide. It is to be understood, however, that very minor quantities of free calcium oxide, such as are often found in commercial cement compositions do not affect the operability of the process of the present invention. However, large quantities of free calcium oxide cause cross-linking to intractible compositions during fabrication of the filled resins. Portland cement which is the preferred oxide has the following composition:

| Constituent | Limits of composition, percent | Average Composition, percent |
| --- | --- | --- |
| Lime | 60.0 to 64.5 | 62.0 |
| Silica | 20.0 to 24.0 | 22.0 |
| Alumina | 5.0 to 9.0 | 7.5 |
| Magnesia | 1.0 to 4.0 | 2.5 |
| Iron oxide | 2.0 to 4.0 | 2.5 |
| Sulfur trioxide | 1.0 to 1.75 | 1.5 |

("The Hydrous Oxides", Harry Boyer Weiser, McGraw-Hill Book Company, Inc., New York, 1926, page 385.)

The oxides or aquasetting reagents of the present invention can serve a dual purpose, they neutralize the filled copolymer and can also act as fillers in the way that fillers are normally employed. If it is desired to employ the oxide primarily to neutralize the filled copolymer, then compositions which are close to the line $C_3S$ and $C_3A$ are employed, since they release the highest concentration of calcium oxide upon contact with water. If it is desired to emphasize the filler aspect with only minor neutralization, compositions closer to the line CS-C₂AS-C₃A₅ are employed. Compositions in the areas vertically lined are normally not employed in the present invention since the neutralization effect is small compared to the filling effect. Substantially the same considerations set forth for the combinations of CaO, SiO$_2$ and Al$_2$O$_3$ apply when the calcium is substituted by magnesium or sodium or if either the silicon or the aluminum are substituted by the other amphoteric elements.

The concentration in which the oxide is employed will depend on the degree of neutralization required for any particular application, the concentration of the acid groups in the base copolymer, the quantity of free base released by the oxide on contact with water and the filler effect desired, if any. Hence, it is difficult to set any particular numbers on the concentration. However, in general, a significant property improvement is obtained when 10 to 90 percent of the acid groups are neutralized. It is, in general, preferred to emphasize the improvements resulting from neutralization rather than the improvements resulting from the filler aspect of the added oxide. Under such conditions the concentration of the oxide varies from 1 to 50 percent based on the composition, with oxides in which the quantity of base released from the oxide is equivalent to that of commercial cement compositions which are capable of releasing a high percentage of free base during neutralization.

The reaction which results in the formation of the intractible polymer has been called neutralization. Neutralization is achieved through reaction with water which causes free base to be released from the oxide and which in turn reacts with the acid groups of the polymer in a manner not yet clearly understood to form a crosslinked, intractible polymer composition. In view of the fact that the resulting crosslinked product has properties different from that of a filled composition crosslinked by conventional means, it is believed that the crosslinks formed in the aqueset copolymers are different from the polymer to polymer molecule crosslinks formed by prior art techniques. The release of the base from the hydrolyzable oxide and the reaction of the released base with the acid group of the copolymer are substantially independent of temperature or pressure. However, the degree of neutralization depends to a large degree on the rate of water penetration into the copolymer. At room temperature the rate of penetration is very slow and neutralization occurs at 13 percent per year as measured on a 50 mil sheet of an ethylene copolymer containing about 10 percent of an acid group containing monomer. At 50° C., the rate of neutralization is increased to 0.7 percent per day. At 100° C. complete neutralization is accomplished in one to three hours; and at 180° C. neutralization is complete within three to four minutes. The rate of water penetration depends, of course, not only on the temperature at which the copolymer is contacted with water, but also on the hydrophilic nature of the copolymer. This will vary from copolymer to copolymer depending on the concentration of polar groups in the copolymer of which the acid group is one. Hence, an increase in the acid concentration in a copolymer will result in a faster rate of neutralization under otherwise identical conditions.

Since the preferred copolymers of the present invention are generally hydrophobic and the neutralization is generally preferred to be carried out in the shortest time possible, elevated temperatures and even pressure are desirable. Particularly, temperatures in the range of 50 to 200° C. are suitable. The upper temperature is, of course, somewhat limited by the nature of the filled copolymer in that it is desirable that the formed filled copolymer does not lose its shape during the neutralization as a result of being heated to above its melting point before neutralization becomes effective.

Neutralization and degree of neutralization is generally measured by infrared spectroscopy of the neutralized polymer. Although the reaction with the base results in an insoluble salt type of linkage, the nature of the bond is ionic and, hence, the neutralized acid can be measured by an absorptions band of 6.4 microns which is characteristic of the ionized carboxyl acid group. Similarly, the unionized acid group and, therefore, the unreacted acid group, is measured by an absorption band of 10.6 microns. By virtue of these bands and also by virtue of the decrease of the crystallinity band at 13.7 microns, it is possible to measure the degree of neutralization as well as the rate of penetration of water into a composition under any particular conditions.

The incorporation of the oxide into the copolymer is carried out by using blending techniques heretofore employed in the incorporation of a solid material into a thermoplastic resin. The most common method of preparing the filled copolymer is by use of a Banbury mixer. It is, of course, desirable to prepare a homogenous blend of the oxide and the copolymer. The blending is preferably carried out in a dry atmosphere in order to prevent premature crosslinking. It should, however, be pointed out that minor neutralization is not critical as long as it does not affect the fabricability of the filled copolymer. After the incorporation of the oxide the filled copolymer, whose melt flow properties are substantially unaffected by the addition of the oxide is fabricated into the shaped article desired by one of the many techniques which have been developed for thermoplastic resins, such as injection molding, extrusion, compression molding, blow molding, vacuum forming, etc. The resulting article can then be neutralized in either a continuous or batch operation by placing the article in a heated water bath or in or through a heated and/or pressurized steam chamber.

In view of the large number of controllable variables, such as type of monomer, polymer, molecular weight, acid comonomer concentration, type and concentration of oxide and degree of neutralization, it is possible to vary the properties of the aquaset polymers of the present invention to suit any particular application from a partially intractible copolymer to a completely intractible copolymer. In general, however, the properties improved in the aquaset polymers of the present invention are stress crack resistance, low brittleness temperature, oil resistance to deformability at high temperatures, yield strength, form stability, insolubility, resistance to corona discharged and rigidity. The latter is particularly surprising since, in general, using prior art techniques, crosslinking causes a decrease in rigidity in thermoplastic crystalline resins, since crosslinking tends to reduce crystallization on which rigidity is based.

The composition of aquaset copolymers and their properties is further illustrated by the following data. It is to be understood that the data are not intended to limit the invention to the specific compositions disclosed, and that similar results are obtained with compositions other than specifically illustrated within the scope of the invention hereinabove discussed.

Unless otherwise indicated, the filled copolymers were obtained by melt blending, on a mill roll at a temperature of 125° to 150° C., the oxide and the base copolymer until a homogenous mass had been formed. The resulting composition was then compression molded into sheets and then neutralized. The neutralization was carried out by suspending the sheets in water, if temperatures did not exceed 100° C. or by placing the sheets in an autoclave and steaming the sheets at a pressure of 69 p.s.i.g. to 225 p.s.i.g.

EXAMPLES 1 TO 13

The base copolymer employed in the compositions illustrated in Table I is an ethylene methacrylic acid copolymer containing 10 weight percent of methacrylic acid based on the copolymer. The copolymer is filled with 25 weight percent, based on the composition, of Type I Portland cement. The filled copolymer is molded into sheets of 50 to 60 mil thicknesses.

The data in Table I illustrates the minor reduction in melt flow resulting from the addition of the oxide and the subsequent large reduction to a no flow (NF) polymer by neutralization. A polymer is considered no flow if the melt index is below 0.01 dg./min. The table also illustrates the improvement in tensile properties and stiffness obtained with aquaset copolymers. Example 7 shows a substantially completely neutralized aquaset copolymer. Although neutralization is slower at lower temperatures, the data indicate such to result in a greater improvement of properties.

ployed, it is clear that oxide concentrations in the range of 10 to 45 percent are preferred.

Electrical properties on the aquaset copolymer of Example 21 were also determined. This material was found to have a dissipation factor at $10^6$ cps. of 0.0045, a dielectric constant at $10^6$ cps. of 2.97, a volume resistivity of $5.4 \times 10^{16}$ ohms and a dielectric strength of 790 volts/mil.

*Table I*

| Example No. | Composition | Neutralization | | Properties | | | | |
|---|---|---|---|---|---|---|---|---|
| | | Temp. in ° C. | Time | Melt Index [1] in dg./min. | Stiffness [2] in p.s.i. | Yield [3] in p.s.i. | Rupture Tensile [3] in p.s.i. | Ultimate Elongation [3] in percent |
| 1 | Base Copolymer | | | 6 | 9,000 | 930 | 3,100 | 480 |
| 2 | Filled Copolymer | | | 4.3 | 17,200 | 1,110 | 2,099 | 330 |
| 3 | Neutralized Copolymer | 100 | 5 min. | 1.2 | | 1,820 | 2,080 | 230 |
| 4 | ----do---- | 100 | 15 min. | 0.2 | | 2,200 | 2,460 | 200 |
| 5 | ----do---- | 100 | 30 min. | 0.14 | | 2,380 | 2,560 | 195 |
| 6 | ----do---- | 100 | 1 hr. | 0.04 | | 2,530 | 2,710 | 190 |
| 7 | ----do---- | 100 | 3 hr. | 0.04 | 55,100 | 2,620 | 2,930 | 180 |
| 8 | ----do---- | 100 | 8 hr. | NF | | 2,620 | 2,900 | 160 |
| 9 | ----do---- | 150 | 45 min. | NF | 27,300 | 2,240 | 2,730 | 130 |
| 10 | ----do---- | 175 | (4) | .02 | 28,000 | 2,200 | 3,000 | 150 |
| 11 | ----do---- | 175 | 45 min. | NF | 27,500 | 2,240 | 2,700 | 80 |
| 12 | ----do---- | 175 | 1.5 hr. | NF | 25,200 | 2,130 | 2,730 | 100 |
| 13 | ----do---- | 200 | 45 min. | NF | 26,800 | 2,230 | 3,070 | 70 |

[1] ASTM D-1238-57T test method.
[2] ASTM D-747-58T test method.
[3] ASTM D-412-51T test method.
[4] Heat up and cool down.

EXAMPLES 25 TO 41

The copolymers employed in Examples 25 to 41 illustrated in Table III are ethylene methacrylic acid copolymers having a melt index of about 6 dg./min. The oxide employed is Type I Portland cement. Example 25 illustrates a filled polyethylene composition. The properties of polyethylene are only slightly modified by the

*Table II*

| Example No. | Composition | Weight Percent of Oxide [4] | Neutralization | | Properties | | | | |
|---|---|---|---|---|---|---|---|---|---|
| | | | Temp., ° C. | Time in hrs. | Melt Index [2] in dg./min. | Stiffness [3] in p.s.i. | Yield [1] in p.s.i. | Rupture [1] Tensile in p.s.i. | Ultimate [1] Elongation in Percent |
| 14 | Base Copolymer | 0 | | | 6 | 9,000 | 930 | 3,100 | 480 |
| 15 | Filled Copolymer | 2 | | | 5.8 | | 970 | 2,900 | 420 |
| 16 | Neutralized Copolymer | 2 | 100 | 1 | 3.6 | | 1,430 | 2,780 | 400 |
| 17 | Filled Copolymer | 10 | | | 4.5 | 14,500 | 1,100 | 2,710 | 430 |
| 18 | Neutralized Copolymer | 10 | 100 | 1 | 0.7 | 20,000 | 1,990 | 2,580 | 280 |
| 19 | Filled Copolymer | 25 | | | 3.3 | 17,200 | 1,110 | 2,090 | 330 |
| 20 | Neutralized Copolymer | 25 | 100 | 3 | 0.04 | 55,100 | 2,340 | 2,910 | 220 |
| 21 | Filled Copolymer | 35 | | | 3.6 | 22,800 | 1,700 | 1,730 | 240 |
| 22 | Neutralized Copolymer | 35 | 100 | 3 | NF | 58,000 | 2,740 | 2,800 | 125 |
| 23 | Filled Copolymer | 45 | | | 2.6 | 24,900 | 1,810 | 1,610 | 100 |
| 24 | Neutralized Copolymer | | 100 | 3 | NF | 63,100 | 2,650 | 2,650 | 25 |

[1] ASTM D-412-51T test method.
[2] ASTM D-1238-57T test method.
[3] ASTM D-747-58T test method.
[4] Based on total composition.

EXAMPLES 14 TO 24

The base copolymer employed in this series of examples is an ethylene methacrylic acid copolymer in which the methacrylic acid concentration is 10 weight percent based on the compound. The oxide employed is Type I Portland cement. Although there is a significant effect of the neutralization on the properties of the filled copolymer when a low concentration is emaddition of the oxide and no further change is noted on subjecting the filled composition to a neutralization environment. It will be noted that the oxide even in the filled, unreacted copolymer has a beneficial effect on the properties of the copolymer which goes beyond the effect noted with polyethylene. This beneficial effect is called "positive reinforcement." However, such positive reinforcement even at high filler concentrations has a minor effect on melt flow, thus allowing fabrication of the filled copolymer. Substantially all of the copolymers containing significant amounts of carboxylic acid groups and oxide are, of course, crosslinked to the no flow point and exhibit greatly improved properties over the filled compositions.

EXAMPLES 46 TO 58

Examples 46 to 58 illustrate the formation of aquaset copolymers employing base copolymers obtained on the polymerization of various monomers with various car-

*Table III*

| Example No. | Copolymer Type | Weight Percent Acid [4] | Weight Percent Oxide [5] | Neutralization | | Properties | | | | |
|---|---|---|---|---|---|---|---|---|---|---|
| | | | | Temp. in °C. | Time in hrs. | Melt Index [1] in dg./min. | Stiffness [2] in p.s.i. | Yield [3] in p.s.i. | Rupture Tensile [3] p.s.i. | Percent Elongation [3] |
| 25 | Filled | 0 | 25 | | | 0.7 | 30,000 | 1,140 | 1,120 | 160 |
| 26 | do | 3 | 25 | | | 3.7 | 31,500 | 1,450 | 1,450 | 100 |
| 27 | Aquaset | 3 | 25 | 100 | 3 | 0.04 | 49,500 | 1,720 | 1,570 | 100 |
| 28 | Base | 10 | | | | 6 | 9,000 | 930 | 3,100 | 480 |
| 29 | Filled | 10 | 35 | | | 3.6 | 22,800 | 1,700 | 1,730 | 240 |
| 30 | Aquaset | 10 | 35 | 100 | 3 | NF | 58,000 | 2,740 | 2,800 | 125 |
| 31 | Base | 18 | | | | 6 | | 1,300 | 5,400 | 450 |
| 32 | Filled | 18 | 35 | | | 2.7 | 58,000 | 2,250 | 2,390 | 250 |
| 33 | Aquaset | 18 | 35 | 100 | 3 | NF | 127,000 | 3,850 | 3,520 | 60 |
| 34 | Filled | 5 | 45 | | | 2.6 | 34,600 | 1,750 | 1,620 | 70 |
| 35 | Aquaset | 5 | 45 | 100 | 3 | NF | 71,900 | 21,000 | 1,810 | 50 |
| 36 | Filled | 7 | 45 | | | 4.6 | 23,400 | 1,550 | 1,430 | 75 |
| 37 | Aquaset | 7 | 45 | 100 | 3 | NF | 42,000 | 1,990 | 1,810 | 60 |
| 38 | Filled | 10 | 45 | | | 2.6 | 24,900 | 1,810 | 1,610 | 100 |
| 39 | Aquaset | 10 | 45 | 100 | 3 | NF | 63,100 | 2,650 | 2,650 | 25 |
| 40 | Filled | 18 | 45 | | | 1.3 | 74,100 | 2,670 | 2,290 | 70 |
| 41 | Aquaset | 18 | 45 | 100 | 3 | NF | 110,000 | 4,070 | 3,850 | 30 |

[1] ASTM D-1238-57T test method.
[2] ASTM D-747-58T test method.
[3] ASTM D-412-51T test method
[4] Based on copolymer.
[5] Based on composition.

EXAMPLES 42 TO 45

Examples 42 to 45 illustrate the formation of aquaset copolymers in the presence of an additive such as carbon black. As can be seen from the results in Table IV additives have no significant effect on the formation of aquaset copolymers.

boxylic acid comonomers. As can be seen from Table V direct as well as graft copolymers are suitable base copolymers. The base copolymers illustrated were filled with 15 percent, based on the composition, of white Portland cement, and were molded into 20 mil sheets and then neutralized in boiling water for a period of one hour.

*Table IV*

| Example No. | Copolymer | Weight Percent Acid [4] | Weight Percent Oxide [5] | Neutralization | | Properties | | | | |
|---|---|---|---|---|---|---|---|---|---|---|
| | | | | Temp. in °C. | Time in hrs. | Melt Index [1] in dg./min. | Stiffness [2] in p.s.i. | Yield [3] in p.s.i. | Rupture Tensile [3] p.s.i. | Percent Elongation [3] |
| 42 | Filled | 5 | 5 | | | 5.4 | 18,500 | 1,130 | 2,200 | 450 |
| 43 | Filled +2.5% carbon | 5 | 5 | | | 4.4 | 22,900 | 1,120 | 2,170 | 420 |
| 44 | Aquaset | 5 | 5 | 100 | 3 | 1.0 | 45,800 | 1,710 | 2,250 | 365 |
| 45 | Aquaset +2.5% carbon | 5 | 5 | 100 | 3 | 1.0 | 48,600 | 1,690 | 2,080 | 335 |

[1] ASTM D-1238-57T test method.
[2] ASTM D-747-58T test method.
[3] ASTM D-412-51T test method
[4] Based on copolymer.
[5] Based on composition.

*Table V*

| Ex- No. | Copolymer | Weight percent Acid [3] | Melt Index [1] in dg./min. | | | Yield Strength [2] in p.s.i. | | | Ult. Elongation [2] in percent | | |
|---|---|---|---|---|---|---|---|---|---|---|---|
| | | | Base | Filled | Aquaset | Base | Filled | Aquaset | Base | Filled | Aquaset |
| 46 | Ethylene/Maleic Anhydride | 3 | 200 | 130 | 1.3 | 1,200 | 1,300 | 1,500 | 70 | 60 | 6 |
| 47 | Ethylene/Methyl Hydrogen Maleate | 6 | 6.0 | 7.2 | 0.06 | 1,250 | 1,590 | 1,800 | 65 | 180 | 190 |
| 48 | Ethylene/Maleic Acid | 3 | 36 | 24 | .23 | 1,270 | 1,390 | 1,760 | 250 | 95 | 40 |
| 49 | Ethylene/Fumaric Acid | 3 | 6.4 | 9.6 | 0.17 | 1,120 | 1,180 | 1,270 | 350 | 90 | 70 |
| 50 | Ethylene/Itaconic Acid | 6 | 8.7 | 4.9 | NF | 1,450 | 1,450 | 1,950 | 360 | 220 | 90 |
| 51 | Polypropylene/Methacrylic Acid | 2 | 5 | 1.3 | NF | 4,600 | 5,170 | 6,230 | <10 | <10 | <10 |
| 52 | do | 3.5 | 100 | 82 | 34 | 4,900 | 5,300 | 6,450 | <10 | <10 | <10 |
| 53 | Methyl Methacrylate/Methacrylic Acid | 18 | 0.5 | 0.3 | 0.07 | 9,300 | 10,500 | 12,000 | <10 | <10 | <10 |
| 54 | Styrene/Methacrylic Acid | 5 | [4] 6.2 | [4] 3.1 | [5] NF | 5,400 | 6,200 | 8,400 | <10 | <10 | <10 |
| 55 | Ethylene/Vinyl Acetate/Methacrylic Acid | 10 | 6.3 | 3.3 | 0.03 | 305 | 990 | 1,370 | 530 | 350 | 260 |
| 56 | Ethylene/Methyl Methacrylate/Methacrylic Acid | 7.5 | 8.2 | 5.9 | 0.06 | 420 | 1,100 | 1,510 | 660 | 480 | 275 |
| 57 | Vinyl Chloride/Methacrylic Acid | 10 | [6] 0.8 | [6] .1 | [6] NF | 350 | 840 | 1,510 | 480 | 330 | 200 |
| 58 | Ethylene/Butene Copolymer/Methacrylic Acid | 1.5 | 5.0 | 2.5 | .16 | 2,500 | 2,650 | 3,110 | 750 | 520 | 380 |

[1] ASTM D-1238-57T test method.
[2] ASTM D-412-51T test method.
[3] Based on copolymer.
[4] Using a 9,880 g. weight.
[5] 30 min. at 175° C., 9,880 g. weight.
[6] 125° C.

EXAMPLES 59 TO 66

Examples 59 to 66 illustrate the use of various oxides in the formation of aquaset copolymers. As can be seen from Table VI, oxides of basic metals which are not cocrystallized give rise to intractible copolymers during the filling operation and are therefore unsuitable for the purposes of the present invention. Hydrolyzable cocrystallized oxides, on the other hand, result in aquaset copolymers. Amphoteric oxides by themselves do not result in aquaset polymers.

Cocrystallized oxides of the following type $Sb_2O_3/CaO$, $SnO_2/CaO$, $PbO_2/CaO$ and $TiO_2/CaO$ result in aquaset copolymers of the type illustrated in Table VI.

Table VI

| Example No. | Copolymer | Weight percent Acid Concentration [2] | Oxide Type | Oxide Weight Percent [3] | Melt Index Base | Melt Index Filled | Melt Index Aquaset |
|---|---|---|---|---|---|---|---|
| 59 | Ethylene/Methacrylic Acid | 10 | Silica gel | 25 | 6 | 2.1 | 1.9 |
| 60 | do | 10 | $2SiO_2/Al_2O_3$ | 25 | 6 | 2.2 | 2.2 |
| 61 | do | 10 | $Al_2O_3$ | 25 | 6 | 1.4 | 1.5 |
| 62 | do | 10 | CaO | 25 | 6 | NF | |
| 63 | do | 10 | $MgO/SiO_2$ | 25 | 6 | 0.2 | 0.08 |
| 64 | do | 10 | $MgO/SiO_2Al_2O_3$ | 25 | 6 | 3.3 | 0.7 |
| 65 | do | 10 | $2.4\ CaO/Al_2O^3$ | 25 | 6 | 1.2 | 0.4 |
| 66 | do | 10 | $NaO/3.5\ SiO_2$ | 25 | 6 | 3.6 | 0.8 |

[1] ASTM D-1238-57T.
[2] Based on copolymer.
[3] Based on total composition.

EXAMPLE 67

A filled copolymer was prepared by blending an ethylene methacrylic acid copolymer containing 10 percent of methacrylic acid and having a melt index of 6.0 dg./min with 25 weight percent of Type I Portland cement. The resulting filled copolymer was extruded onto #14 wire using a 2″ Egan wire coater equipped with a 0.136″ pressure die. The temperature in the extruder barrel was maintained at 180° C., and in the die at 180° C. The wire was coated at the rate of 20 ft./min. The resulting wire, having a 30 mil coating was neutralized by boiling in water for four hours.

The aquaset copolymer coating was subjected to a scrape test with a four pound load on the blade. No failure of the insulation was noted after 10,000 scraped. An unmodified polyethylene, on the other hand, fails in 400 to 600 scrapes.

EXAMPLE 68

To 800 g. of an ethylene methacrylic acid copolymer, containing 10.7 percent methacrylic acid by weight based on copolymer having a melt index of 8 dg./min being worked on a roll mill at a temperature of about 165° C. was added 1200 g. of small particle size Type I Portland cement until a uniform composition was obtained. The product was removed from the rolls, and dried in an air oven at 70° C. for 70 hours. The product had a melt index of 2.9 dg./min. Plaques, 3″ x 5″ x 1/16″, were injection molded using a melt temperature of 240° C. and a mold temperature of 38° C. Tensile specimens were cut from the plaques and cured by treatment with water at 90° C. for 20 hours. The specimens had tensile strengths in the machine direction of 4750 p.s.i.

EXAMPLE 69

To 540 g. of an ethylene methacrylic acid copolymer containing 10 percent methacrylic acid by weight, based on the copolymer, and having a melt index of 6 dg./min, was added 1260 g. of a Type I Portland cement on a roll mill at 190–200° C. Milling was continued until a uniform blend was obtained. The product had a melt index of 0.7 dg./min. The material was compression molded into a plaque and then treated in boiling water for three hours. The treated plaque had a tensile strength of 2740 p.s.i., an elongation of 20 percent and a stiffness of 105,000 p.s.i.

EXAMPLE 70

Example 69 was repeated, except that 360 g. of copolymer and 1440 g. of Portland cement was employed. Properties after water treatment were: tensile strength 3150 p.s.i., elongation 10 percent and stiffness 160,000 p.s.i.

The foregoing examples illustrate the formation of the novel compositions of the present invention and their properties. Various modifications of these compositions will be apparent to one skilled in the art and are included within the scope of the present invention. Thus, it is, of course, possible to employ more than one cocrystallized oxide to achieve the desired curing. Similarly, more than one copolymer may be employed in forming the base copolymer. The base copolymer, furthermore, can be blended with other inert fillers, pigments and other polymers prior or after the addition of the cocrystallized oxide. Beyond the proportion necessary to neutralize the acid copolymer the cocrystallized oxide may also be employed as an inert filler. If desirable, stabilizers and other additives for enhancing properties of the copolymer may be added to the copolymer.

The aquaset copolymers, the preparation and properties of which are illustrated in the foregoing examples, can be employed in a large number of applications, particularly in those applications which require rigidity at elevated temperatures. Thus, aquaset copolymers give rise to outstanding wire coatings and can be extruded into pipe and tubing of superior quality as compared to either the base or the filled resin. Aquaset copolymers may be further injection molded or blow molded into rigid articles capable of high temperature applications. It is also feasible to extrude fibers and films from the filled compositions and greatly improve the resulting articles by neutralization. In general, the aquaset copolymers have two major areas of improvement as compared to either the corresponding unmodified resin or the corresponding resins crosslinked by conventional techniques. One area is the improvement in physical properties, such as rigidity, toughness, abrasion resistance and tensile strength, as well as the retention of these properties at high temperatures, and the other area is that of fabricability in that the fabrication step is completely separated from the crosslinking step and one is not in any way affected by the other which is a common drawback in conventional crosslinking methods.

The formation of aquaset copolymers is applicable broadly to resin formed through additional polymerization of ethylenically unsaturated monomers which contain carboxylic acid groups. Although the degree of property modification will differ with the monomers employed, all aquaset copolymers are characterized by substantially lower melt flow as compared to either the base copolymer or the filled copolymer. Since the oxides employed as crosslinking agents will, on hydration or neutralization, react only with the acid groups in the copolymer, it is clear that the formation of the aquaset copolymer is not dependent on the specific nature of the resin resulting from the principal addition monomer. However, aside from the principal characteristic of reducing or eliminating melt flow, it will be apparent that the change in physical properties obtained will differ with the nature of the resin obtained by the polymerization of the particular addition monomer.

We claim:

1. A composition comprising an addition polymer of an ethylenically unsaturated monomer containing polymerized therewith a carboxylic acid group containing monoethylenically unsaturated monomer, said acid group containing monomer being present in a concentration of at least 0.2 mol percent, based on the polymer, and homogeneously admixed therewith, a hydrolyzable, cocrystallized oxide of a base forming metal and an amphoteric element wherein the base forming metal is a metal selected from the class consisting of metals of Group I and Group II of the Periodic Table, and the amphoteric element is an element selected from the group consisting of silicon, aluminum, titanium, vanadium, molybdenum, tungsten, chromium, manganese, arsenic, bismuth, tin, lead, and antimony, said oxide being employed in a concentration of 2 to 90 weight percent, based on the total composition.

2. The composition of claim 1 wherein the addition polymer is a polymer of an $\alpha$-olefin having the general formula $RCH=CH_2$, where R is a radical selected from the group consisting of hydrogen and alkyl radicals having from 1 to 8 carbon atoms and an $\alpha,\beta$-ethylenically unsaturated carboxylic acid, the acid monomer content of said polymer being from 0.2 to 25 mol percent, based on the polymer.

3. The composition of claim 2 wherein the olefin is ethylene.

4. The composition of claim 1 wherein the amphoteric element is silicon.

5. The composition of claim 1 wherein the amphoteric element is aluminum.

6. The composition of claim 1 wherein the base forming metal is a metal of Group II of the Periodic Table and the amphoteric element is silicon.

7. The composition of claim 1 wherein the base forming metal is a metal of Group II of the Periodic Table and the amphoteric element is aluminum.

8. The composition of claim 2 wherein the base forming metal is an alkaline earth metal and the amphoteric element is silicon.

9. The composition of claim 2 wherein the base forming metal is an alkaline earth metal and the amphoteric element is alumina.

10. The composition of claim 2 wherein the cocrystallized hydrolyzable oxide is Portland cement.

11. The composition of claim 1 wherein the concentration of the cocrystallized hydrolyzable oxide is from 5 to 50 percent.

12. The composition of claim 2 wherein the concentration of the cocrystallized hydrolyzable oxide is from 5 to 50 percent.

13. The process of preparing polymers of reduced melt flow from compositions of claim 1, which comprises treating the composition of claim 1 with water until at least 10 percent of the acid groups have been neutralized.

14. The process of preparing copolymers of reduced melt flow from compositions of claim 1 which comprises treating the composition of claim 2 at a temperature of 50° C. to 200° C., with water, until 50 to 100 percent of the acid groups in said composition have been neutralized.

15. A composition of low melt flow comprising the composition of claim 1 having at least 10 percent of the acid groups in the ionized $COO^-$ form.

16. A composition of low melt flow comprising the composition of claim 2 having from 50 to 100 percent of the acid groups in the ionized $COO^-$ form.

17. A composition comprising a polymer of an $\alpha$-olefin having the general formula $RCH=CH_2$ wherein R is a radical selected from the group consisting of hydrogen and alkyl radicals having from 1 to 8 carbon atoms inclusive, the olefin content of said polymer being at least 50 mol percent, based on the polymer, and an $\alpha,\beta$-ethylenically unsaturated carboxylic acid having 3 to 8 carbon atoms, the acid monomer content of said polymer being from 0.2 to 25 mol percent, based on the polymer, said polymer containing uniformly distributed therein a cocrystallized hydrolyzable oxide of an alkaline earth metal and silicon, said oxide being employed in a concentration of 2 to 90 weight percent, based on the total composition.

18. The composition of claim 17 wherein the olefin is ethylene.

19. The composition of claim 18 wherein the carboxylic acid is methacrylic acid.

20. The composition of claim 17 wherein the oxide is Portland cement.

21. The process of reducing the melt flow of the composition of claim 17 which comprises treating the composition of claim 18 with water at a temperature of 50 to 200° C. until at least 50 percent of the acid groups have been neutralized.

22. A composition of low melt flow comprising the composition of claim 17 having at least 50 percent of the carboxylic acid groups in the ionic form.

23. A composition comprising an addition polymer of an ethylenically unsaturated monomer containing polymerized therewith a carboxylic acid group containing monomer, said acid group containing monomer being present in a concentration of at least 0.2 mol percent, based on the polymer, and homogeneously admixed therewith, a hydrolyzable, cocrystallized oxide of a base forming metal and an amphoteric element, said oxide being employed in a concentration of 2 to 90 weight percent, based on the polymer.

24. The composition of claim 1 in funicular form.

No references cited.

MORRIS LIEBMAN, *Primary Examiner.*

J. S. WALDRON, *Assistant Examiner.*

UNITED STATES PATENT OFFICE
CERTIFICATE OF CORRECTION

Patent No. 3,272,771                                                  September 13, 1966

Robert Marion Busche et al.

It is hereby certified that error appears in the above numbered patent requiring correction and that the said Letters Patent should read as corrected below.

Column 1, line 11, after "copending" insert -- application --; column 6, line 19, for "strontinum" read -- strontium --; column 8, lines 6 and 9, for "of", each occurrence, read -- at --; line 46, after "oil" insert -- resistance, --.

Signed and sealed this 24th day of October 1967.

(SEAL)
Attest:

Edward M. Fletcher, Jr.                                      EDWARD J. BRENNER

Attesting Officer                                                     Commissioner of Patents